July 12, 1932.  E. G. MERRICK  1,867,416
PROTECTION OF DYNAMO ELECTRIC MACHINES
Original Filed March 5, 1930
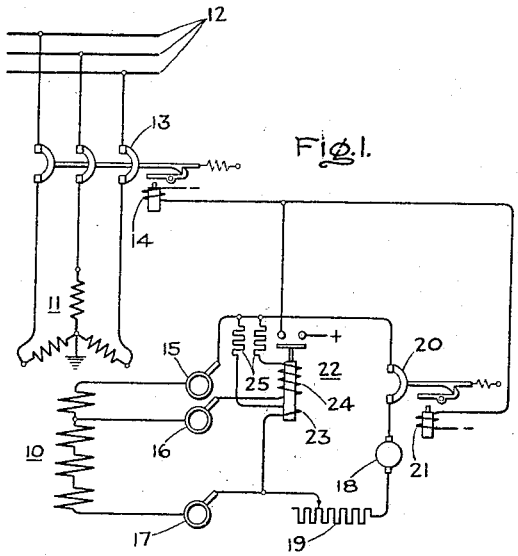
Fig. 1.
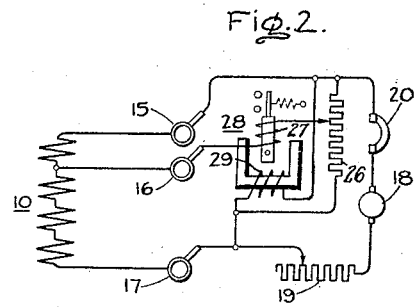
Fig. 2.
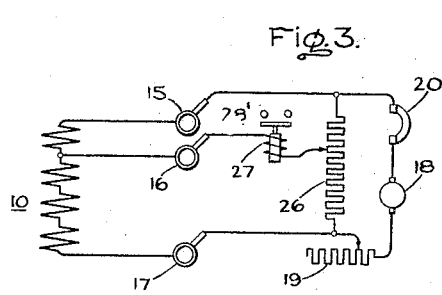
Fig. 3.
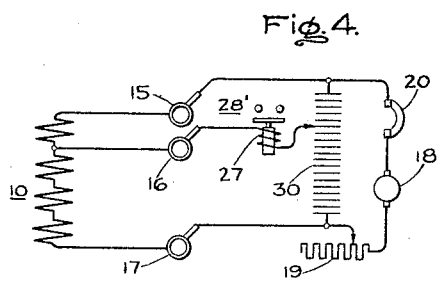
Fig. 4.
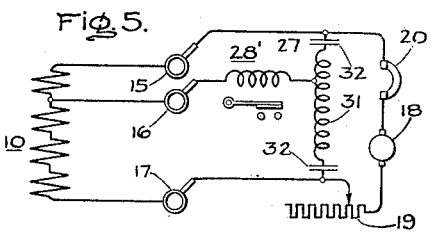
Fig. 5.
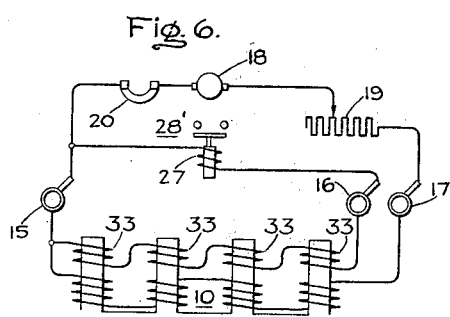
Fig. 6.
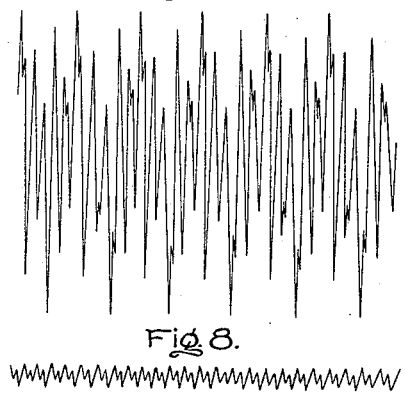
Fig. 7.
Fig. 8.
Inventor:
Eldridge G. Merrick,
by Charles E. Tullos
His Attorney.

Patented July 12, 1932

1,867,416

UNITED STATES PATENT OFFICE

ELDRIDGE G. MERRICK, OF SCHENECTADY, NEW YORK, ASSIGNOR TO GENERAL ELECTRIC COMPANY, A CORPORATION OF NEW YORK

PROTECTION OF DYNAMO-ELECTRIC MACHINES

Application filed March 5, 1930, Serial No. 433,456. Renewed March 16, 1932.

My invention relates to improvements in the protection of dynamo-electric machines, and more particularly to the protection of synchronous dynamo-electric machines against internal faults and an object of my invention is to provide an improved arrangement for protecting dynamo-electric machines whereby to discriminate positively between faults within and without a machine and to obtain a high degree of sensitivity so that even an incipient fault can be readily detected prior to becoming of such a severe nature as to cause serious damage.

My invention will be better understood from the following description when considered in connection with the accompanying drawing and its scope will be pointed out in the appended claims.

This application is a continuation in part of my copending application Serial No. 342,822, filed February 26, 1929, for protection of dynamo-electric machines, the subject matter in said prior application being incorporated in this application together with certain additional subject matter.

In the accompanying drawing, Fig. 1 illustrates diagrammatically a protective arrangement embodying my invention; Figs. 2 to 6 inclusive illustrate diagrammatically modifications of my invention, and Figs. 7 and 8 are wave forms representing the electromotive force conditions in different parts of the field winding of a synchronous dynamo-electric machine having a part of its armature winding short-circuited.

For the purpose of illustrating my invention I have shown in Fig. 1 a dynamo-electric machine having two relatively movable windings 10 and 11, which form respectively the field and armature windings of a synchronous machine such as a generator, condenser or motor. The armature winding 11 is arranged to be connected to a bus 12 by suitable circuit controlling means such as a circuit breaker 13, shown as of the latched-closed type and provided with a trip coil 14. It is immaterial which of the windings 10 and 11 is the rotor or stator winding, but in the several figures of the drawing I have assumed that the field winding is the moving winding and it is accordingly provided with the necessary slip rings 15, 16 and 17. The circuit of the field winding 10 includes a suitable exciter unit 18 and a regulating resistance 19 and is arranged to be controlled by suitable means, shown as a latched-closed circuit breaker 20 provided with a trip coil 21.

In accordance with my invention, I provide means which is operative in response to a fault involving a portion of one of the machine windings such as the armature winding 11 and which is so connected as to be energized in accordance with the relative values of the electromotive forces induced at any instant in two different predetermined numbers of turns of the other winding 10 by the relative movement of this winding and the faulty portion of the winding 11. As shown in Fig. 1, this means includes an electroresponsive device, such as a relay 22, having two co-operating windings 23 and 24, the former being connected across all of the turns of the winding 10 and the latter across that part of the turns of the winding 10 between the brush rings 15 and 16. Suitable means such as resistors 25 are included in circuit with the relay windings 23 and 24 to limit the amount of direct or exciting current flowing in these windings. In order to eliminate any possibility of operation of the relay 22 by the direct current normally flowing in its windings 23 and 24, the turns of these windings may be proportioned, as shown, inversely to the predetermined numbers of turns of the field winding 10 across which they are connected. While I have shown the field winding 10 as including only four poles and the relay winding 24 connected across only one of these poles, it is to be understood that the total number of poles of the machine is not important and also that the number of turns across which the relay windings are connected can be varied to suit individual designs of machines. Preferably the ratio between the greater and the lesser predetermined numbers of field winding turns is made as large as possible since this gives the maximum voltage unbalance. However, as the number of poles increases, the ratio may be decreased since by so doing it is possible to maintain on the relay an effective value of the unbalanced induced electromotive forces for a longer time and thus positively insure relay operation.

With the arrangement shown in Fig. 1, the relay 22 is of a differential type and the resultant effect of the windings 23 and 24 due to the direct current therein is substantially zero. In case of a fault such as a short-circuit involving only a portion of the winding 11, each time that the short-circuited portion passes the winding on a field pole it induces therein an alternating electromotive force whose value is dependent on the number of turns short-circuited. For any given part or fraction of the field winding such as one pole, this electromotive force has a relatively high value as indicated by the largest peaks in the wave form shown in Fig. 7, but for the whole field winding the resultant alternating electromotive force is relatively small, as shown by the wave form of Fig. 8. This will be apparent since the voltage induced in the given fraction of the field winding is practically all consumed in the remainder of the winding since the impedance of this winding is very large in comparison with the impedance of the circuit. In other words, for an internal fault on the winding 11, the voltage appearing across the field winding 10 is approximately zero but voltages appear periodically in the windings of the successive poles as they pass the short-circuited portion of the armature winding. The voltage per pole is not uniform and may be many times the voltage across the field winding 10 as Figs. 7 and 8 indicate. It will be apparent, therefore, that when the relatively high alternating electromotive force appears in the relay winding 24 of many turns it will be opposed by the relatively weak electromotive force obtained in the winding 23 of few turns and, consequently, the resultant differential effect of these windings will produce operation of the relay 22 which may be arranged to control contacts in an auxiliary circuit for alarm indicating or tripping purposes such as the circuit of the trip coils 14 and 21. If the field winding 10 is intact and a fault occurs external to the armature winding 11, for example a short-circuit on the bus 12, the voltage appearing across the field 10 is uniformly distributed, that is, each pole shares alike, so that the differentially operating windings 23 and 24 of the relay 22 remain balanced and the relay does not operate. In case of an external fault with a short-circuit existing between sufficient field turns, the balance between the relay coils 23, 24 will be disturbed. The relay 22 may be arranged to operate under these conditions.

In the embodiment of my invention shown in Fig. 2, I connect across the field winding 10 suitable impedance means such as a resistor 26 and between intermediate points of the resistor and the field winding, the winding 27 of an electroresponsive device such as a relay 28. These intermediate points are so chosen as to be normally equipotential and such that an alternating current sufficient to operate the relay 28 appears in the winding 27 thereof only on the occurrence of an internal short-circuit of the armature winding 11 which is not shown in any of Figs. 2 to 6 inclusive or the field winding 10. If desired, the relay 28 may be of the two cooperating windings' type, the second winding 29 being connected across the field 10 so that with the simultaneous energization of both the windings 27 and 29 a torque will be exerted to close the contacts of the relay. Inasmuch as no current appears in the winding 27 under normal conditions or under conditions accompanying external faults unless there is a short circuit in the field winding 10, there will then be no resultant torque tending to operate the relay 28.

The embodiment of my invention shown in Fig. 3 is similar to that illustrated in Fig. 2 except that the relay 28' has the single winding 27 connected in the same manner as the winding 27 of the relay 28 in Fig. 2.

While in the embodiments of my invention shown in Figs. 2 and 3, the resistor 26 may be of any suitable type, I may, either in order to keep the normal energy loss in the resistor very low, or to obtain greater sensitivity or both, use a resistance material having a negative ampere characteristic with no time lag. Such a resistance material is disclosed in the copending application of K. B. McEachron, Serial No. 198,512, filed June 13, 1927, and assigned to the same assignee as this invention. In such a resistor the normal loss may be relatively low since its characteristic is of the exponential form $I = KE^n$, I being the current, E the voltage, K a constant and "n" an exponent greater than unity. Thus at normal excitation voltage, relatively small current appears in the the resistor 26 and substantially no current appears in the relay winding 27. But in case of a short circuit in the armature winding 11 the high voltage induced in the fraction of the field winding under consideration by the passage of the short-circuiting turns causes a relatively large current to flow in the circuit of the relay winding 27. For a given voltage this current will be, by reason of the characteristic of this resistor, much greater than for a resistor whose resistance does not materially vary with the impressed voltage.

Where it is desired to avoid any direct current losses in the impedance means 26, an impedance 30 as illustrated in Fig. 4 may be employed. The impedance means 30 may be of the capacitance type such as the condenser element shown. Instead of using an all capacitance impedance means as shown in Fig. 4, an impedance means involving an inductance 31 and condensers 32 may be employed as shown in Fig. 5. In this figure, the relay 28' is schematically illustrated as of the sensitive induction disk type.

In the embodiment of my invention shown in Fig. 6 the relay 28' has its winding 27 connected in series with a plurality of series connected windings 33 so arranged on the field poles of the machine that their resultant electromotive force is normally zero. As shown in the drawing, this may be accomplished by having the windings 33 equally distributed on the unlike poles of the machine. With this arrangement it will be apparent that in case of an internal fault, the alternating electromotive force induced in any one of the windings 33 at any instant by the passing of the short-circuited turns of the armature will be relatively high while that in the remainder of the windings will be relatively low so that the difference appears in the relay winding 27 as a relatively large amount to effect the operation of the relay.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:—

1. In combination with a synchronous dynamo-electric machine having relatively movable field and armature windings, means operative in response to the short-circuiting of a portion of the armature winding connected to be energized in accordance with the relative values of the electromotive forces induced at any instant in two different predetermined numbers of field winding turns by the relative movement of the field winding and the short-circuited portion of the armature winding.

2. In combination with a synchronous dynamo-electric machine having relatively movable field and armature windings, means operative in response to the short-circuiting of a portion of the armature winding connected to be energized in accordance with the relative values of the electromotive forces induced at any instant in unequal portions of the field winding by the relative movement of the field winding and the short-circuited portion of the armature winding.

3. In combination with a synchronous dynamo-electric machine having relatively movable field and armature windings, means operative in response to a fault involving said windings including impedance means connected across said field winding, a connection between intermediate points of said field winding and said impedance means normally at the same potential and an electroresponsive device having a winding in circuit with said connection, said connection being made between intermediate points such that an alternating current appears in the winding of the electroresponsive device only on the occurrence of an internal short circuit of the armature winding or an external fault when a part of the field winding is short circuited.

4. In combination with a dynamo-electric machine having two relatively movable windings, means operative in response to the short-circuiting of a portion of one winding connected to be energized in accordance with the relative values of the electromotive forces induced at any instant in two different predetermined numbers of turns of the other winding by the relative movement of said short-circuited portion and said other winding.

5. In combination, a dynamo-electric machine having relatively movable field and armature windings and means for controlling the circuit of one of said windings on the occurrence of a fault involving only a part of the turns of a winding, including a circuit interrupter and electro-responsive control means therefor connected to be energized in accordance with the relative values of the electromotive forces induced at any instant in two different predetermined numbers of turns of one of the windings by the relative movement of the windings.

6. In combination, a synchronous dynamo-electric machine having relatively movable field and armature windings and means for controlling the circuit of the armature winding on the occurrence of a fault involving only a part of the turns thereof including a circuit interrupter and a relay for controlling the interrupter connected to be energized in accordance with the relative values of the voltages induced at any instant in two different predetermined numbers of field winding turns by the relative movement of the field winding and the faulty part of the armature winding.

7. The combination, a synchronous dynamo-electric machine having relatively movable field and armature windings and means for controlling the circuit of the armature winding on the occurrence of a short-circuit involving only a part of the turns thereof including a circuit interrupter, impedance means connected across said field winding and arrange to provide a substantially infinite resistance to the flow of a continuous current, a connection between intermediate points of said field winding and said impedance means and an electroresponsive device having a winding in circuit with said connection, said connection being made between intermediate points such that an alternating current appears in the winding of the electroresponsive device on the occurrence of an internal short-circuit of the armature winding.

8. In combination, a synchronous dynamo-electric machine having relatively movable field and armature windings and means for controlling the circuit of the armature winding on the occurrence of a short-circuit involving only a part of the turns thereof including a circuit interrupter, impedance means connected across said field winding and including a capacitance element, a connection between intermediate points of said field winding and said impedance means and a relay having a winding connected in series relation with said connection, said connection being made between intermediate points such that an alternating current appears in the winding of the electroresponsive device on the occurrence of an internal short-circuit of the armature winding.

9. In combination, a synchronous dynamo-electric machine having relatively movable field and armature windings, means operative in response to a fault involving one of said windings including an impedance means connected across the field winding, a connection between normally equi-potential points of said field winding and said impedance means and electroresponsive means having a winding in circuit with said connection.

In witness whereof, I have hereunto set my hand this 4th day of March, 1930.

ELDRIDGE G. MERRICK.